United States Patent
Sasho et al.

(10) Patent No.: US 6,259,997 B1
(45) Date of Patent: Jul. 10, 2001

(54) SIGNAL POWER DETECTION APPARATUS

(75) Inventors: Noboru Sasho; Jun Iwasaki, both of Tokyo; Satoshi Konya, Kanagawa; Tomoya Yamaura, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/120,318

(22) Filed: Jul. 22, 1998

(30) Foreign Application Priority Data

Jul. 25, 1997 (JP) .................................................. 9-200247

(51) Int. Cl.[7] .......................... G01R 21/00; G01R 21/06; G06F 19/00
(52) U.S. Cl. ............................... 702/60; 702/57; 702/189
(58) Field of Search .................................. 702/57, 60, 69, 702/74–79, 107, 110, 124–126, 183, 189, 194, 199; 324/132, 111, 102, 119; 375/224, 225, 227, 324, 325, 328, 340, 342

(56) References Cited

U.S. PATENT DOCUMENTS

| | | | |
|---|---|---|---|
| 3,222,454 | * | 12/1965 | Losee ..................................... 375/331 |
| 3,439,283 | * | 4/1969 | Danielson ............................. 329/302 |
| 4,589,019 | * | 5/1986 | Dischert et al. ...................... 348/688 |
| 5,323,329 | * | 6/1994 | Keane ..................................... 702/60 |
| 5,621,766 | * | 4/1997 | Bakke et al. .......................... 375/340 |

\* cited by examiner

*Primary Examiner*—Kamini Shah
*Assistant Examiner*—Manuel L. Barbee
(74) *Attorney, Agent, or Firm*—Jay H. Maioli

(57) ABSTRACT

A signal power detection apparatus in which a power value can be detected at a high accuracy with a low power consumption includes a pulse generator for generating a timing pulse whose phase is sequentially shifted corresponding to an inputted data signal, a power computing circuit for obtaining the inputted data signal based on a timing pulse and computing a power value of the inputted data signal by squaring a voltage value of the inputted data, and an averaging circuit for averaging the power value of the computed inputted data. A power can be accurately detected without using a high-speed timing clock, and a power value can be detected at a high accuracy with a low power consumption.

5 Claims, 8 Drawing Sheets

FIG. 5A  I DATA; DI AND Q DATA; DQ
FIG. 5B  THE FIRST MASK PATTERN MP1 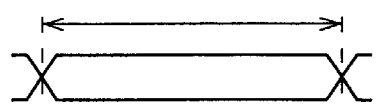
FIG. 5C  THE SECOND MASK PATTERN MP2 
FIG. 5D  THE THIRD MASK PATTERN MP3 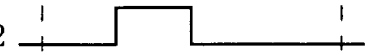
FIG. 5E  THE FOURTH MASK PATTERN MP4 
FIG. 5F  MASTER CLOCK CK1 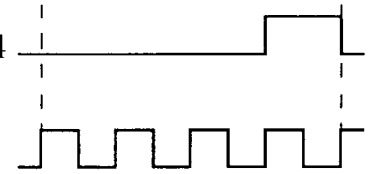

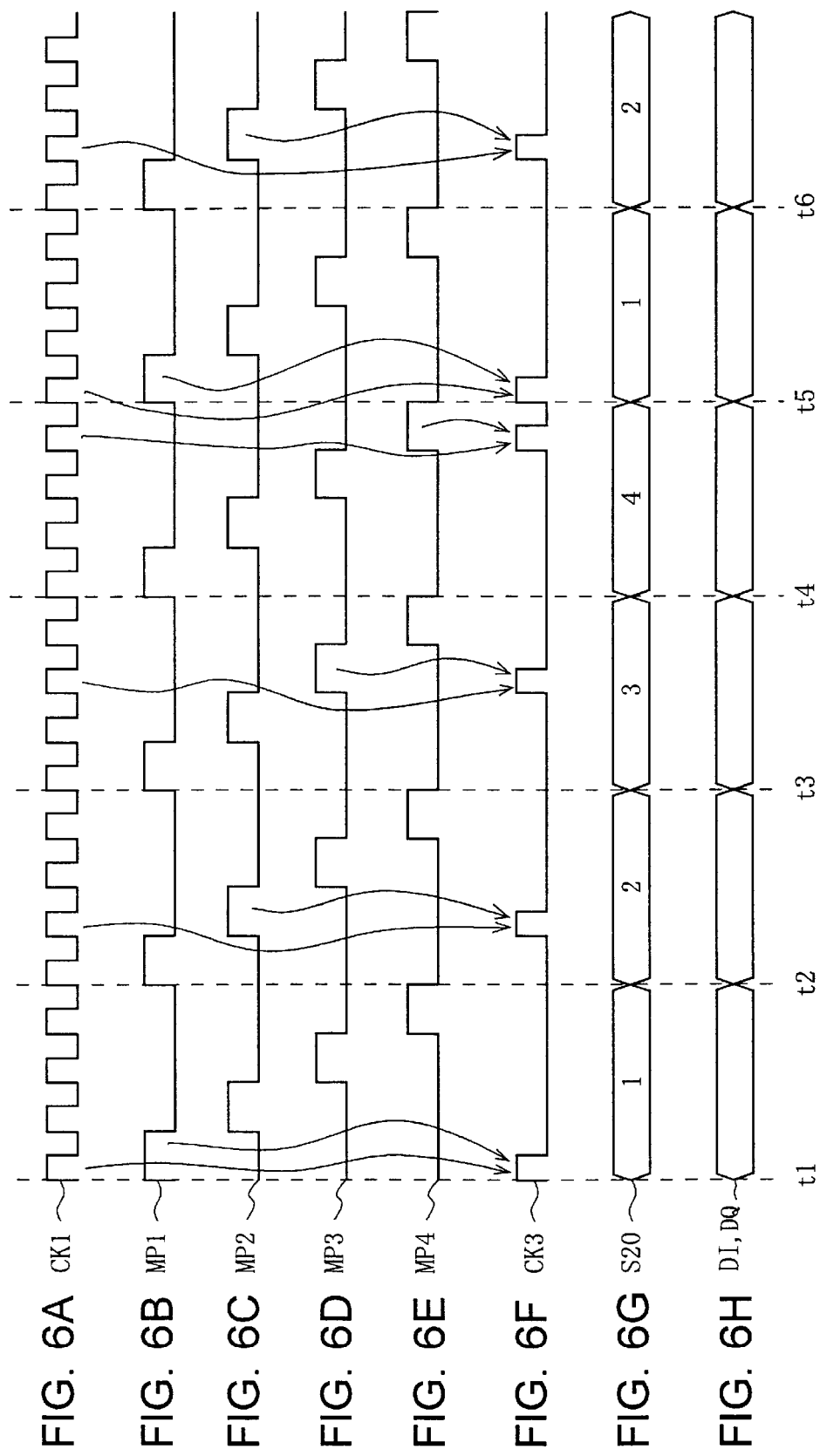

SIGNAL POWER DETECTION APPARATUS

BACKGROUND OF THE INVENTION

1. Field of the Invention

This invention relates to a signal power detection apparatus, and is suitably applied to a received power detection circuit mounted on a portable telephone, for example.

2. Description of the Related Art

Heretofore, portable telephones are able to adjust a received signal to a desired power by controlling a gain of a variable-gain amplifier based on a detected result of a received power with a received power detection circuit. Thus, portable telephones can perform demodulation while keeping a received signal at a constant signal level even when the received signal is affected by fading or the like through a transmission line.

The received power detection circuit will be concretely described below with reference to FIG. 1. In the following description, assume that a received signal has QPSK (Quadrature Phase Shift Keying) modulation. As shown in FIG. 1, in a received power detection circuit 1, in-phase signal data DI (hereinafter simply referred to as "I data") and quadrature signal data DQ (hereinafter simply referred to as "Q data") which are demodulated from the received signal are respectively inputted to latch circuits 2 and 3. The I data DI and the Q data DQ are generated by analog-to-digital-converting the in-phase signal and the quadrature signal which result from quadrature-demodulating the received signal.

The latch circuits 2 and 3 include clock input terminals CLK to latch a master clock CK1 of a portable telephone or a clock CK2 which results from dividing the master clock CK1 by a frequency divider 4. The latch circuits 2 and 3 use the clock CK1 or CK2 as a sampling clock, latch the I data DI or the Q data DQ inputted to data input terminals IN with sampling based on the clock CK1 or CK2, and output the I data DI or the Q data DQ via data output terminals OUT to squaring circuits 5 and 6 as latch outputs DI1 and DQ1.

The squaring circuit 5 computes a power PI1 of the I data DI by squaring a voltage value of the latch output DI1 and outputs the computed power PI1 to an adder 7. In the same way, the squaring circuit 6 computes a power PQ1 of the Q data DQ by squaring a voltage value of the latch output DQ1 and outputs the computed power PQ1 to the adder 7. The adder 7 computes a synthesized power P1 by adding these powers PI1 and PQ1, and outputs the synthesized power P1 to a multiplier 8. The multiplier 8 multiplies the synthesized power P1 with a predetermined coefficient k in order to prevent a circuit of the succeeding stage from an overflow, and then outputs a resultant received power P2 to an output latch circuit 9.

The master clock CK1 or the clock CK2 is inputted to a clock input terminal CLK of the latch circuit 9 as well. The latch circuit 9 latches the received power P2 inputted to a data input terminal IN based on the clock CK1 or CK2, and outputs the latched received power P2 as a received power value P3 from a data output terminal OUT. In this manner, this received power detection circuit 1 latches the inputted I data DI and Q data DQ based on the predetermined clock CK1 or CK2, calculates the powers PI1, PQ1 of the respective data by squaring the voltage values, and computes the received power value P3 by adding the powers PI1 and PQ1.

The conventional received power detection circuit 1, however, is unable to detect a power at a high accuracy with a low power consumption. This problem will be described with reference to the following concrete examples. Initially, assume that a clock frequency of the master clock CK1, for example, is four times as high as the symbol frequency of the I data DI and the Q data DQ. In case that such master clock CK1 is not frequency-divided and used as a sampling clock, then, a sampling-timing relationship between the master clock and the I data DI or the Q data DQ is presented as shown in FIGS. 2A and 2D. That is, in this case, the sampling is performed four times at one symbol period, and is performed at a relatively short interval compared to the symbol period, so that the accurate received power value P3 can be obtained. However, in this case, since the frequency of the sampling clock is high, the latch circuits 2, 3 and 9 of the circuit arrangement of CMOS system and the squaring circuits 5 and 6 have to be operated at a high speed so that a power consumption on the received power detection circuit 1 increases as a whole.

On the other hand, in case that the clock CK2 is obtained by frequency-dividing the master clock CK1 by four and is used as a sampling clock, the period of which becomes equal to the symbol period, then, a sampling-timing relationship between the sampling clock and the data is presented as shown in FIGS. 2A and 2B. That is, in this case, the sampling is performed once at one symbol period and the operation speeds of the latch circuits 2, 3 and 9 and the squaring circuits 5 and 6 decrease, so that a power consumption on the received power detection circuit can be reduced as compared with the case in which the master clock CK1 is used as the sampling clock.

In case that the clock CK2 is obtained by frequency-dividing the master clock CK1 by eight and is used as a sampling clock, the period of which becomes twice as long as the symbol period, and then, a sampling-timing relationship between the sampling clock and the data is presented as shown in FIGS. 2A and 2C. That is, in this case, the sampling is performed once every two symbol periods and the operation speeds of the latch circuits 2, 3 and 9 and the squaring circuits 5 and 6 further decrease, so that the power consumption on the received power detection circuit can be further reduced.

In this connection, the power consumption on the received power detection circuit can be reduced when the clock CK2 which results from frequency-dividing the master clock CK1 is used as the sampling clock. On the contrary, it is impossible to compute the received power value P3 accurately. An inaccuracy of the received power value P3 occurs due to a phase relationship between the symbol period and the sampling clock. As shown in FIG. 2B, for example, even though the clock CK2 being equal to the symbol period is generated, the symbol period and the clock CK2 do not always keep in the same phase relationship, and the phase relationship becomes random depending upon the timing at which the clock CK2 is generated. The leading edge of the clock CK2 may occasionally agree with the symbol period as shown in FIG. 2B, or the leading edge of the clock CK2 may occasionally be deviated from the symbol period by a half period as shown in FIG. 2E.

In this case, fundamentally, when the phase relationship shown in FIG. 2B takes place, this phase relationship should be maintained so that the leading edge of the clock CK2 should constantly agree with the symbol period. In case that the sampling is performed at the leading edge of the clock CK2, a narrow phase portion (portion where voltage amplitude is small) of the eye pattern is sampled every time, so that a received power value P3 relatively smaller than the actual received power value is computed.

On the other hand, in the case where the phase relationship shown in FIG. 2E takes place, the leading edge of the clock CK2 should constantly agree with the center of the symbol period, so that a wide phase portion (portion where voltage amplitude is large) of the eye pattern is sampled every time. As a consequence, a received power value P3 relatively larger than the actual received power value is computed.

When the clock CK2 which results from frequency-dividing the master clock CK1 by 4 is used as the sampling clock, there is the problem that the received power value P3 cannot be computed accurately. This problem is found also when the clock CK2 which results from frequency-dividing the master clock CK1 by 8 is used as the sampling clock.

When the clock CK2 equaling to the symbol period is generated by frequency-dividing the master clock CK1 and used as a sampling clock, if a symbol frequency and a sampling clock frequency are slightly deviated from each other due to a frequency deviation of an oscillator for generating the master clock CK1, a phase relationship is deviated progressively. Thus, even in the fixed state, in which a received power value is not changed at all in actual practice, the received power value P3 is unavoidably changed due to a fluctuation period. For example, if a frequency has a difference of 1 Hz, then the received power value P3 is fluctuated at a period of one second.

As described above, for obtaining the received power value P3 at a high accuracy, the conventional received power detection circuit 1 has to increase the clock frequency, so that its power consumption increases unavoidably. Conversely, for reducing the power consumption, the received power value P3 is fluctuated due to the phase relationship between the clock and the inputted data, so that the received power value P3 cannot be obtained at a high speed. Therefore, the conventional received power detection circuit has not achieved to the signal power detection apparatus functions satisfactority.

SUMMARY OF THE INVENTION

In view of the foregoing, an object of this invention is to provide a signal power detection apparatus, in which a power value can be detected at a high accuracy with a low power consumption.

The foregoing object and other objects of the invention have been achieved by the provision of a signal power detection apparatus for detecting a power value of the inputted data. This signal power detection apparatus is composed of pulse generating means for generating a timing pulse whose phase is sequentially shifted corresponding to the inputted data, power computing means for receiving a voltage value of the inputted data signal in response to the timing pulse and computing a power value of the inputted data by squaring the voltage value of the inputted data signal, and averaging means for averaging the computed power value of the inputted data.

In this way, the timing clock whose phase is sequentially shifted corresponding to the inputted data is generated. The inputted data is latched based on the timing clock, and the power value is computed and then averaged. Therefore, as the timing at which the inputted data is latched is shifted sequentially, being different from the prior art, it can be avoided that the portion of the inputted data in which the voltage value is small is constantly latched or that the portion of the inputted data in which the voltage value is large is constantly latched, so that the power value can be computed from respective portions of the inputted data and then the computed power value can be averaged. As a result, the accurate power values can be computed. Therefore, this signal power detection apparatus can accurately detect a power without using a high-speed timing clock which is used in the prior art. Moreover, since the high-speed timing clock is not used, the operation speed decreases, and hence a power consumption can be reduced.

Further, according to this invention, a signal power detection apparatus for detecting a synthesized power value of a first and second inputted data whose phases agree with each other is provided. This signal power detection apparatus comprises: clock generating means for generating first and second timing clocks whose phases are shifted from each other; power computing means for receiving the first inputted data based on the first timing clock, squaring a voltage value of the first inputted data to compute a power value of the first inputted data, receiving the second inputted data based on the second timing clock, squaring a voltage value of the second inputted data to compute a power value of the second inputted data, and adding the computed power values of the first and second inputted data to compute the synthesized power value; and averaging means for averaging the synthesized power value.

In this way, the first and second timing clocks whose phases are shifted are generated, the first and second inputted data are latched based on the first and second timing clocks respectively, the respective power values are computed and added together, and the synthesized power value is computed and then averaged. Since the first and second inputted data are latched with the different timings, it can be avoided that the portion of the inputted data in which the voltage value is small is constantly latched or the portion of the inputted data in which the voltage value is large is simultaneously latched, that can not be avoided in the prior art. Therefore, this signal power detection apparatus can accurately detect a power without using a high-speed timing clock which is used in the prior art. Moreover, since the high-speed timing clock is not used, the operation speed decreases, so that a power consumption can be reduced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A to 5F are signal waveform diagrams showing mask patterns of a 4-pattern masking circuit;

FIGS. 6A to 6H are timing charts showing a timing relationship between mask patterns and timing clocks;

DETAILED DESCRIPTION OF THE EMBODIMENT

Figure 3:
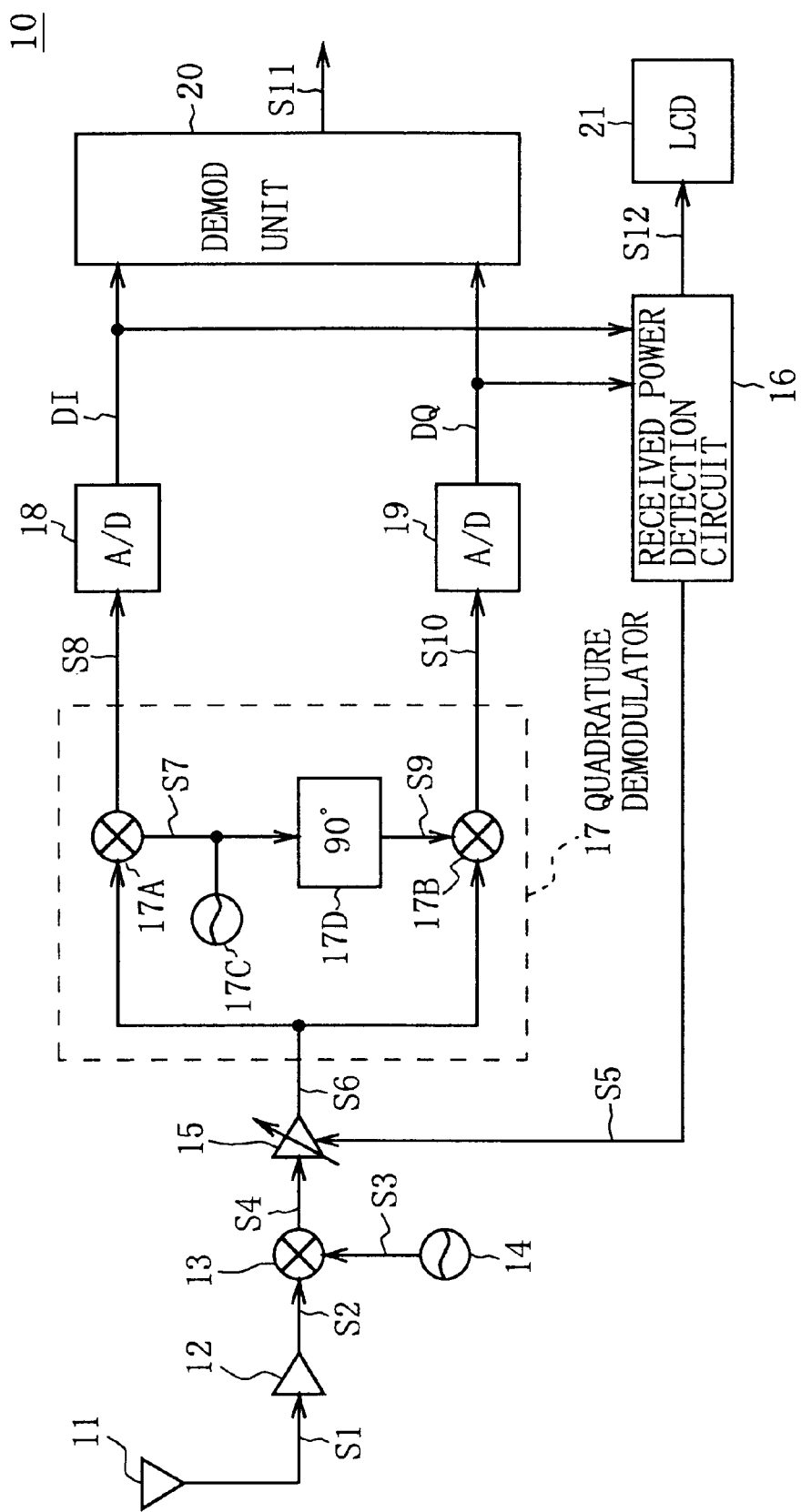
FIG. 3 is a block diagram showing a reception apparatus to which a received power detection circuit according to this invention is applied.

Preferred embodiments of this invention will be described with reference to the accompanying drawings:

In FIG. 3, reference numeral 10 generally designates a reception apparatus to which this invention is applied. This reception apparatus is used as a reception apparatus of a radio communication terminal apparatus such as a portable telephone. In this reception apparatus 10, a received signal S1 received at an antenna 11 is inputted to a high-frequency amplifier 12. This high-frequency amplifier 12 amplifies the inputted received signal S1 to a predetermined power, and outputs a resultant received signal S2 to a multiplier 13 comprising a frequency-converting circuit. The multiplier 13 frequency-converts (so-called, down-converts) the received signal S2 by multiplying the received signal S2 with a clock signal S3 generated from a local oscillator 14, and outputs a resultant baseband signal S4 to a variable-gain amplifier 15.

The variable-gain amplifier 15 is adapted to adjust a power of the baseband signal S4 by a gain based on a gain control signal S5 supplied from a received power detection circuit 16. This variable-gain amplifier 15 amplifies the baseband signal S4 by the gain based on the gain control signal S5, and outputs a resultant baseband signal S6 to a quadrature demodulator 17.

In the quadrature demodulator 17, initially, the baseband signal S6 is inputted to multipliers 17A and 17B. The multiplier 17A multiplies the baseband signal S6 with a clock signal S7 generated from an oscillator 17C to generate an I signal S8, and outputs this signal to an analog-to-digital converter 18 of the succeeding stage. On the other hand, the multiplier 17B receives a clock signal S9 which results from phase-shifting the phase of the clock signal S7 by 90° by a phase shifter 17D, multiplies the baseband signal S6 with the thus generated clock signal S9 to generate a Q signal S10, and outputs this signal to an analog-to-digital converter 19 of the succeeding stage.

The analog-to-digital converter 18 analog-to-digital converts the I signal S8 to provide I data DI, and outputs the same to a demodulation unit 20 and the received power detection circuit 16. In the same way, the analog-to-digital converter 19 analog-to-digital converts the Q signal S10 to provide Q data DQ, and outputs the same to the demodulation unit 20 and the received power detection circuit 16.

The demodulation unit 20 generates data shown by the I data DI and the Q data DQ, and outputs the same as received data S11. Thus, this reception apparatus 10 can restore data transmitted from the other side of the transmission and output the same as the received data Sll.

On the other hand, the received power detection circuit 16 computes a reception power value based on the I data DI and Q data DQ thus inputted, generates a gain control signal S5 based on the reception power value and outputs the same to the variable-gain amplifier 15. Thus, this reception apparatus 10 can adjust the baseband signal S4 to a desired power by controlling the gain of the variable-gain amplifier 15. Thus, even when the inputted data is affected by a fading or the like through the transmission line, the reception apparatus 10 can hold the signal level of the baseband signal constant and effect the demodulation. Also, the received power detection circuit 16 outputs the power value data S12 which indicates the computed received power value to a display device 21 such as a liquid-crystal display. Thus, this reception apparatus 10 displays the power value thus computed on the display device 21 to let the user know the received power value.

In this connection, a master clock, which is not shown, is supplied to the digital circuits such as the analog-to-digital converters 18 and 19, the demodulation unit 20 and the received power detection circuit 16. These digital circuits are operated based on the master clock or a clock which results from frequency-dividing the master clock.

Figure 1:
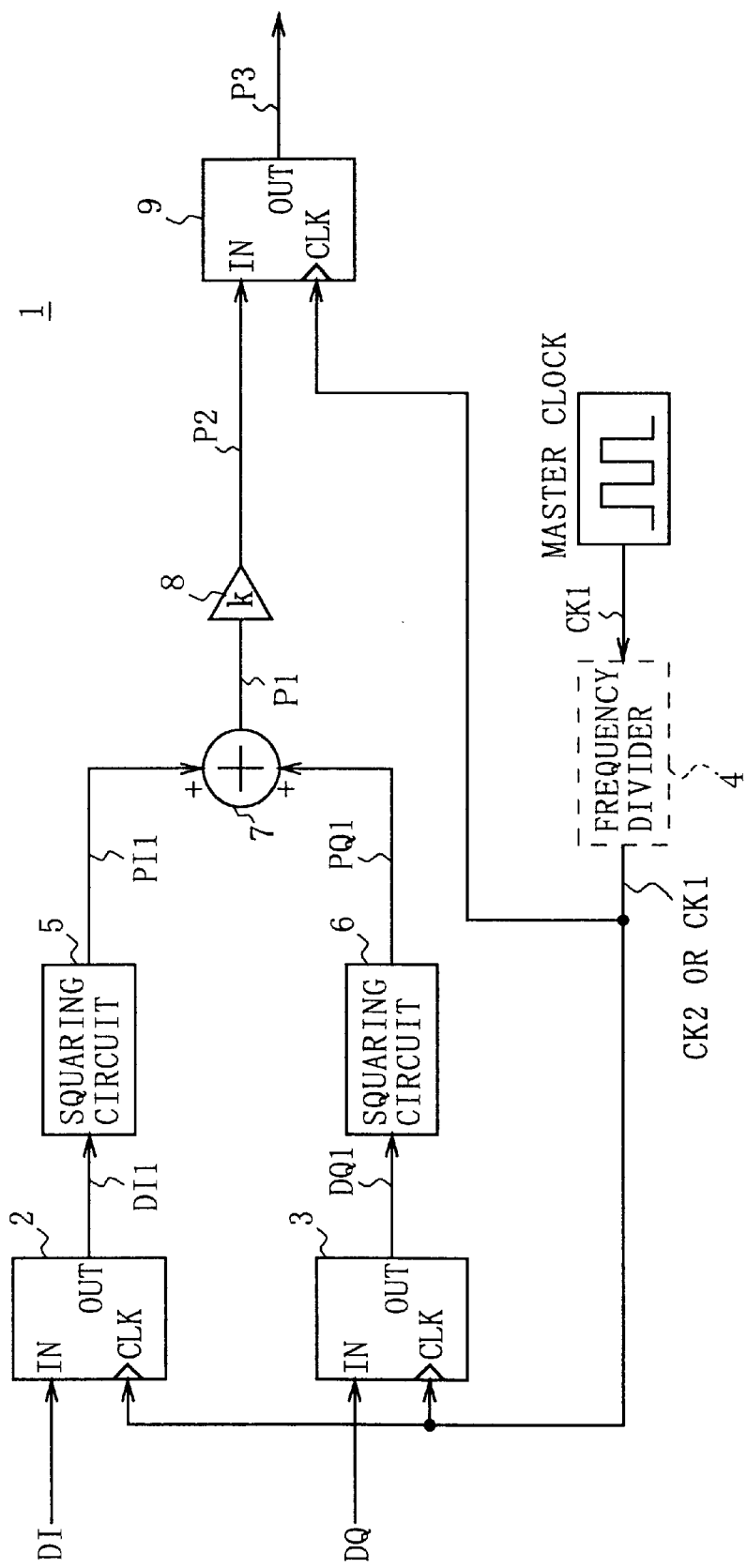
FIG. 1 is a block diagram showing a received power detection circuit according to the prior art.
Figure 2:
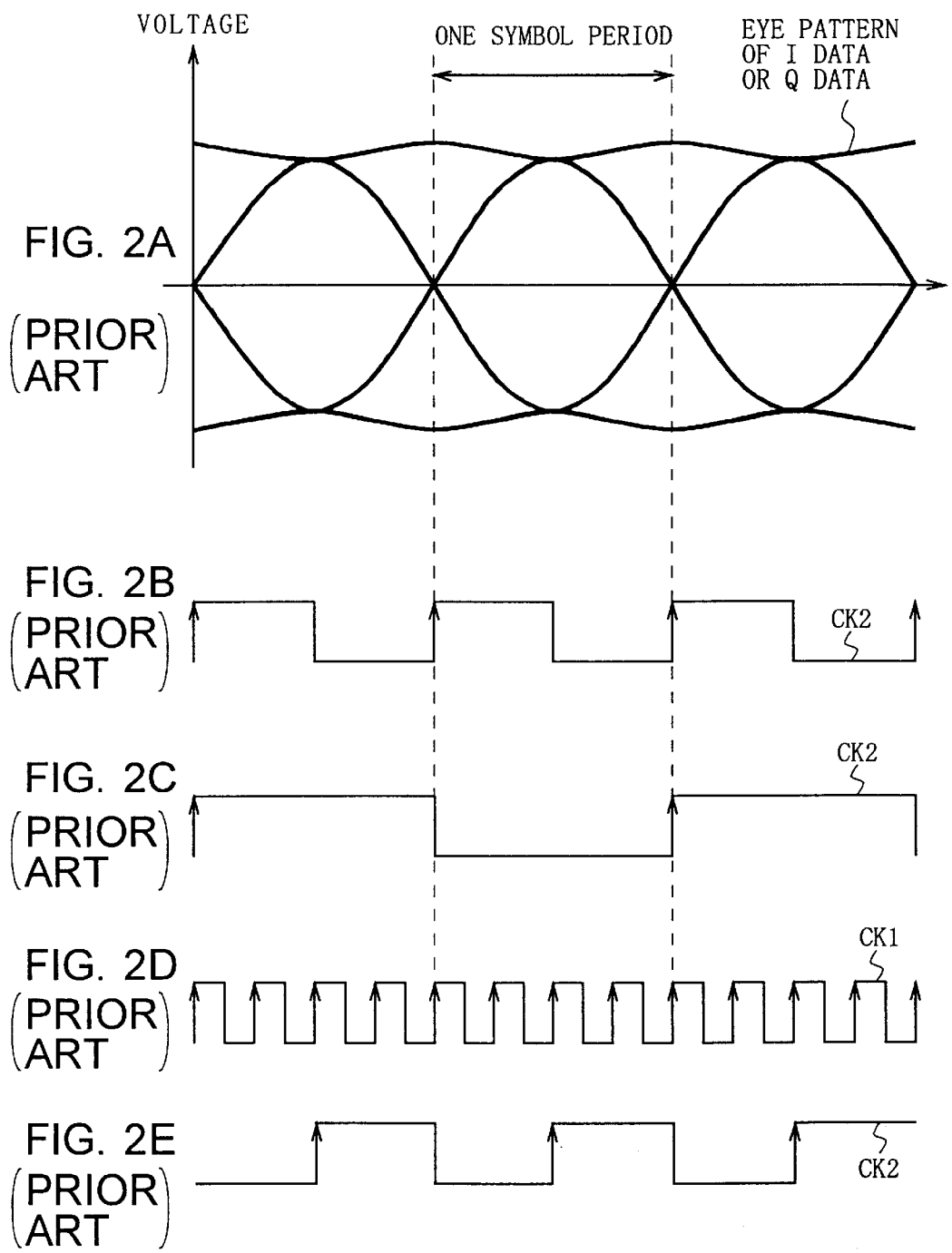
FIGS. 2A to 2E are timing charts showing a timing at which I data and Q data are latched in the prior-art received power detection circuit.
Figure 4:
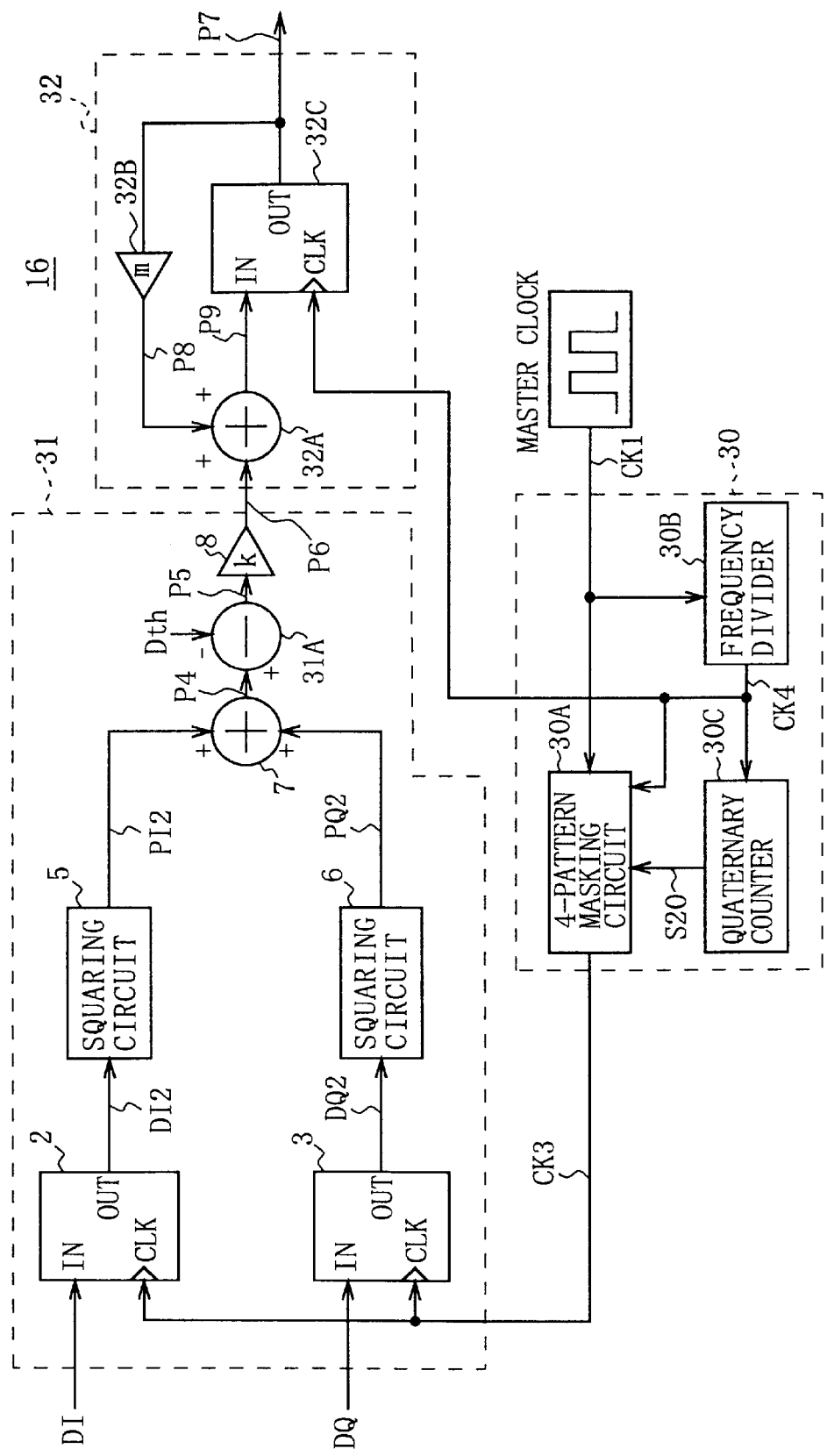
FIG. 4 is a block diagram showing a received power detection circuit according to a first embodiment.

The received power detection circuit 16 will be described concretely with reference to FIG. 4. As shown in FIG. 4 in which elements and parts identical to those of FIG. 1 are marked with the same reference numerals, the received power detection circuit 16 generally comprises a timing generator unit 30 for generating a power detection timing clock CK3, a power computation unit 31 for computing power data P6 by latching inputted data (I data DI and Q data DQ) based on the timing clock CK3 and an integrating circuit unit 32 for computing a received power value P7 by averaging the value of the power data P6.

The timing generator unit 30 receives a master clock CK1 which serves as a reference operation clock of each digital circuit of the reception apparatus 10 and inputs this to a 4-pattern masking circuit 30A and a frequency divider 30B. In the following description, assume that the master clock CK1 has a frequency four times as high as the symbol frequency of the I data DI and the Q data DQ.

The frequency divider 30B generates a clock CK4 equaling to the symbol frequency by frequency-dividing the master clock CK1 by four, and outputs this clock to a quaternary counter 30C, the 4-pattern masking circuit 30A and the integrating circuit unit 32 which will be described later on. The quaternary counter 30C cyclically counts values ranging from "1" to "4" based on the clock CK4, and outputs count data S20 which indicates the count value to the 4-pattern masking circuit 30A.

The 4-pattern masking circuit 30A has a memory formed of a ROM, for example, and memorizes first to fourth mask patterns of four kinds having different phases in such memory. The 4-pattern masking circuit 30A uses the clock CK4 as a read clock of this memory, and reads out a corresponding mask pattern of the four kinds of the mask patterns from the memory based on the value of the count data S20. For example, the 4-pattern masking circuit 30A reads out the first mask pattern from the memory if the value of the count data S20 is "1", reads out the second mask pattern from the memory if the value of the count data S20 is "2", reads out the third mask pattern from the memory if the value of the count data S20 is "3", and reads out the fourth mask pattern from the memory if the value of the count data S20 is "4".

And then, the 4-pattern masking circuit 30A supplies the mask pattern thus read-out and the master clock CK1 to an AND gate (not shown), so that a timing clock CK3 whose phase is sequentially shifted synchronizing with the clock CK4 is generated, and outputted to the power computation unit 31. In this case, since the frequency of the clock CK4 is equal to the symbol frequency of the I data DI and the Q data DQ, the timing clock CK3 is such a clock that the phase thereof is sequentially shifted at every symbol of the I data DI and the Q data DQ.

In this manner, the timing generator unit 30 prepares in advance the first to fourth mask patterns with different phases, reads out the corresponding mask pattern from the memory based on the value of the count data S20 of the quaternary counter circuit 30C, and computes the thus read-out mask pattern and the master clock CK1 in an AND fashion to generate the timing clock CK3. Therefore, the timing generator unit 30 can easily generate the timing clock CK3 the phase of which is shifted sequentially.

In the power computation unit 31, the timing clock CK3 supplied from the timing generator unit 30 is inputted to each of the clock input terminals CLK of the latch circuits 2 and 3 as a sampling clock. The I data DI is inputted to the data input terminal IN of the latch circuit 2, whereby the latch circuit 2 latches the I data DI at the timing of the leading edge of, for example, the timing clock CK3 and outputs the same through the data output terminal OUT to the squaring circuit 5 as a latch output DI2. In the same way, the Q data DQ is inputted to the data input terminal IN of the latch circuit 3, whereby the latch circuit 3 latches the Q data DQ at the timing of the leading edge of, for example, the timing clock CK3 and outputs the same through the data output terminal OUT to the squaring circuit 6 as a latch output DQ2.

The squaring circuit 5 computes a power PI2 of the I data DI by squaring the voltage value of the latch output DI2 and outputs the same to the adder 7. In the same way, the squaring circuit 6 computes a power PQ2 of the Q data DQ by squaring the voltage value of the latch output DQ2 and outputs the same to the adder 7. The adder 7 computes a synthesized power P4 by adding these powers PI2 and PQ2 and outputs the same to a subtractor 31A. In this connection, a study of the comparison of FIGS. 1 and 4 reveals that, although the circuit arrangements of the power computation unit 31 for obtaining the synthesized power P4 are substantially the same as those of the prior art, the value of the synthesized power P4 is different from the value of the conventional synthesized power P1 because the timing clock CK3 for latching data is different.

In addition to the synthesized power P4, a predetermined threshold value Dth is inputted to the subtractor 31A. The subtractor 31A subtracts the threshold value Dth from the synthesized power P4, and outputs a subtracted result P5 to the multiplier 8. Since this subtracted result P5 is the result of subtracting the threshold value Dth from the synthesized power P4, if the synthesized power P4 is greater than the threshold value Dth, the subtracted result becomes a positive value, and if the synthesized power P4 is smaller than the threshold value Dth, the subtracted result becomes a negative value. The multiplier 8 multiplies the subtracted result P5 with a predetermined coefficient k, and outputs the resultant power data P6 to a succeeding integrating circuit unit 32.

In the integrating circuit unit 32, the power data P6 supplied from the power computation unit 31 is inputted to an adder 32A. A power data P8 which results from multiplying a received power value P7, which was computed one symbol before, with a predetermined coefficient m by a multiplier 32B, has been inputted to the adder 32A. The adder 32A computes an averaged power data P9 by adding this power data P8 and the power data P6, and outputs the same to a data input terminal IN of a latch circuit 32C.

A clock CK4 which results from frequency-dividing the inputted clock with the frequency divider 30B of the timing generator unit 30 is inputted to a clock terminal CLK of the latch circuit 32C. The latch circuit 32C latches the averaged power data P9 based on this clock CK4, and outputs the same through the data output terminal OUT as a received power value P7.

In this manner, the integrating circuit unit 32 computes the averaged power data P9 by a so-called integrating processing in which the power data P6 computed from the present symbol is added to the power data P8 computed up to the present symbol. And then, the integrating circuit unit 32 latches this averaged power data P9 and outputs the latched averaged power data as the received power value P7. In this connection, since the power data P6 is the difference data between the power data and the threshold value Dth, the received power value P7 added to the threshold value Dth becomes the power value obtained in actual practice.

The received power detection circuit 16 includes a signal generating means though not shown. This signal generating means generates the above-mentioned gain control signal S5 and the above-mentioned power value data S12 based on the received power value P7, and outputs the above gain control signal S5 and the above power value data S12 to the variable-gain amplifier 15 and the display device 21, respectively.

The manner in which the timing generator unit 30 generates the timing clock CK3 will be described with reference to FIGS. 5A–5F and 6A–6H. In the memory of the 4-pattern masking circuit 30A, there are stored four kinds of mask patterns MP1 to MP4 shown in FIGS. 5B to 5E. The 4-pattern masking circuit 30A reads out a corresponding mask pattern from the four kinds of the mask patterns MP1 to MP4.

That is, the 4-pattern masking circuit 30A reads out the corresponding mask pattern in such a way as to read out the first mask pattern MP1 if the value of the count data S20 is "1" and to read out the second mask pattern MP2 if the value of the count data S20 is "2". In this case, since the values of "1" to "4" are cyclically outputted as the count data S20, the mask pattern is sequentially read out as in the sequential order of MP1, MP2, MP3, MP4, MP1, . . . .

A study of FIGS. 5A–5F reveals that the interval of the logical level "H" in each of the mask patterns MP1 to MP4 is equal to one period of the master clock CK1. Also, in each of the mask patterns MP1 to MP4, the interval of the logical level "H" is shifted by one period of the master clock CK1, thus the phase is shifted by 90° with reference to the symbol period.

The 4-pattern masking circuit 30A generates the timing clock CK3 by calculating the thus read-out mask patterns MP1, MP2, MP3 or MP4 and the inputted master clock CK1 in an AND fashion. That is, as shown in FIGS. 6A–6H, the 4-pattern masking circuit 30A reads out the mask pattern MP1 at a timing point t1 when the value of the count data S20 becomes "1", calculates this mask pattern MP1 and the master clock CK1 in an AND fashion, and outputs the calculated result as the timing clock CK3. Subsequently, when the value of the count data S20 becomes "2" at a timing point t2, the 4-pattern masking circuit 30A reads out the mask pattern MP2, calculates this mask pattern MP2 and the master clock CK1 in an AND fashion, and outputs the calculated result as the timing clock CK3.

Subsequently, when the value of the count data S20 becomes "3" at a timing point t3, the 4-pattern masking circuit 30A reads out the mask pattern MP3, calculates this mask pattern MP3 and the master clock CK1 in an AND fashion, and outputs the calculated result as the timing clock CK3. Subsequently, when the value of the count data S20 becomes "4" at a timing point t4, the 4-pattern masking circuit 30A reads out the mask pattern MP4, calculates this mask pattern MP4 and the master clock CK1 in an AND fashion, and outputs the calculated result as the timing clock CK3.

In the same way, each time when the value of the count value S20 changes, the 4-pattern masking circuit 30A reads out the mask pattern MP1, MP2, MP3 or MP4, calculates the read-out mask pattern and the master clock CK1 in an AND fashion, and outputs the computed result as the timing clock CK3. Thus, the 4-pattern masking circuit 30A generates the timing clock CK3 in which the interval of logical level "H" is shifted by one period of the master clock CK1 at every symbol of the I data DI and the Q data DQ as shown in FIG. 6F, i.e. the phase is sequentially shifted at every symbol.

In the above-mentioned arrangement, the received power detection circuit 16 generates the timing clock CK3 whose phase is sequentially shifted at every symbol as shown in FIG. 6F as the timing clock for latching the I data DI and the Q data DQ. The received power detection circuit 16 latches the I data DI and the Q data DQ at the timing of, for example, the leading edge of this timing clock CK3, computes the power data P6 based on the voltage values of the thus latched I data (DI2) and the thus latched Q data (DQ2), and generates the received power value P7 by averaging the resultant power data P6 at the integrating circuit unit 32.

Thus, as shown in FIGS. 6F and 6H, for example, even when the first timing of the timing clock CK3 agrees with the edge of the symbol, in the next symbol, the timing of the timing clock CK3 is located near ¼ from the start of the symbol, in the next symbol, the timing of the timing clock CK3 is located near 2/4 from the start of the symbol, and in the next symbol, the timing of the timing clock CK3 is located near ¾ from the start of the symbol. Since the latch timing of the I data DI and the Q data DQ is shifted as described above, it is possible to avoid the disadvantages encountered with the prior art that: the received power value P7 becomes smaller than the power value in actual practice by constantly latching the portion near the symbol edge (portion in which the voltage value is small); and the received power value P7 becomes greater than the power value in actual practice by constantly latching the portion near the center of the symbol (portion in which the voltage value is large).

In the case of this received power detection circuit 16, since the latching timing of the I data DI and the Q data DQ is shifted each time, the value of the received power value P7 would seem to be fluctuated. However, since this received power detection circuit 16 computes the power data P6 based on the thus latched I data (DI2) and Q data (DQ2), generates the averaged power data P9 by averaging the above-mentioned latched data with the integrating circuit unit 32, and outputs this averaged power data P9 as the received power value P7, the received power value P7 can be prevented from being fluctuated and be obtained accurately as if it were computed by latching the data at the timing of the master clock CK1.

Further, since the power data P6 is averaged by the integrating circuit unit 32, even when the frequency of the master clock CK1 is slightly shifted from the symbol frequency like the prior art, the value of the received power value P7 can be prevented from being changed due to the fluctuation period in contrast with the prior art.

Furthermore, in the case of this received power detection circuit 16, since data is latched once per symbol, each digital circuit such as the latch circuits 2, 3 and 32 and the squaring circuits 5 and 6 is operated at the symbol frequency. Hence, the operation speed thereof decreases as compared with the case that each digital circuit is operated at the frequency of the master clock CK1. Accordingly, this received power detection circuit 16 can obtain the accurate received power value P7, which is seemed to be sampled by the master clock CK1, although the power consumption thereof is small.

According to the above-mentioned arrangement, the timing clock CK3 whose phase is sequentially shifted corresponding to the symbol of the I data DI and the Q data DQ is generated, the power data P6 is generated by latching the I data DI and the Q data DQ based on the timing clock CK3 and the received power value P7 is calculated by averaging the power data P6. In consequence, the received power value P7 can be accurately computed at the low power consumption, so that the received power detection circuit 16 which detects the received power value P7 at a high accuracy with a low power consumption can be realized.

Figure 7:
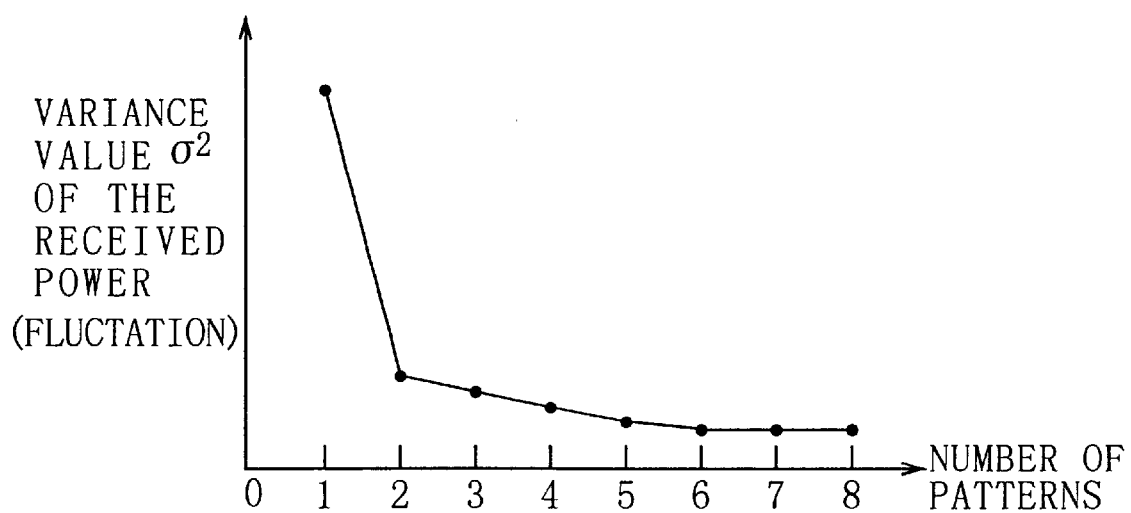
FIG. 7 is a characteristic graph showing a relationship between the number of mask patterns and accuracy of received power value.

While the four kinds of the mask patterns MP1 to MP4 are prepared and the timing clock CK3 whose phase is changed in four patterns is generated by using the mask patterns MP1 to MP4 as described above, this invention is not limited thereto, and two kinds or six kinds of mask patterns may be prepared and a timing clock whose phase is changed in two or six stages may be generated by using the two kinds or six kinds of the mask patterns. FIG. 7 shows the accuracy of the received power value P7 obtained when the kind of the mask patterns is changed. In FIG. 7, the horizontal axis represents the kind of mask patterns, i.e. the number of patterns, and the vertical axis represents a variance value $\sigma^2$ indicating the accuracy of the received power value P7 (variance value generally shows a fluctuation). A study of FIG. 7 reveals that the much more the number of the patterns increases, the smaller the variance value $\sigma^2$ becomes and that the accuracy of the received power value P7 increases. In this connection, in FIG. 7, that fact the number of patterns is "1" shows that the phase of the timing clock is not shifted, i.e. the conventional system, and it is to be understood that the accuracy is lowered extremely. Accordingly, as is clear from FIG. 7, if at least more than two kinds of the patterns are prepared and the phase of the timing clocks is changed in more than two patterns, then the same effect can be substantially achieved as those of the above-mentioned case. Incidentally, when the number of the patterns is changed, a ratio between the speed of the master clock CK1 and the speed of the symbol (i.e. frequency ratio) should be set to be greater than at least the number of patterns.

While the timing clock CK3 for latching the I data DI and the Q data DQ once per symbol is generated by dividing the frequency of the master clock CK1 by four as described above, this invention is not limited thereto, but may be applied to a case where the frequency-dividing ratio of the master clock is increased and the I data DI and the Q data DQ are latched at every predetermined symbol. In fact, if a timing clock whose phase is sequentially shifted in such a manner that the latch timing of the I data and the Q data is shifted at every symbol is generated, then other values may be used as the frequency-dividing ratio of the master clock.

While there are two kinds of the I data DI and the Q data DQ as power detection target input data in which the received signal S1 is QPSK-modulated as described above, this invention is not limited thereto. Even though there is one kind of power detection target data such as when the received signal S1 is BPSK (Binary Phase Shift Keying) modulated, this invention may be applied in the same way as described above with the same effects being achieved. In fact, the number of the power detection target inputted data is not limited.

While the power data P6 is averaged by the integrating circuit unit 32 as described above, this invention is not limited thereto, and averaging means of other arrangement may be provided. In fact, if a computed power is averaged, then the same effects as those of the above-mentioned case can be achieved.

While the timing clock CK3 whose phase is shifted sequentially is generated by calculating the mask patterns MP1, MP2, MP3 or MP4 and the master clock CK1 in an AND fashion as described above, this invention is not limited thereto. When the phase is shifted in two patterns, the clock may be generated by simply inverting the clock. This point will be described with reference to FIG. 8.

Figure 8:
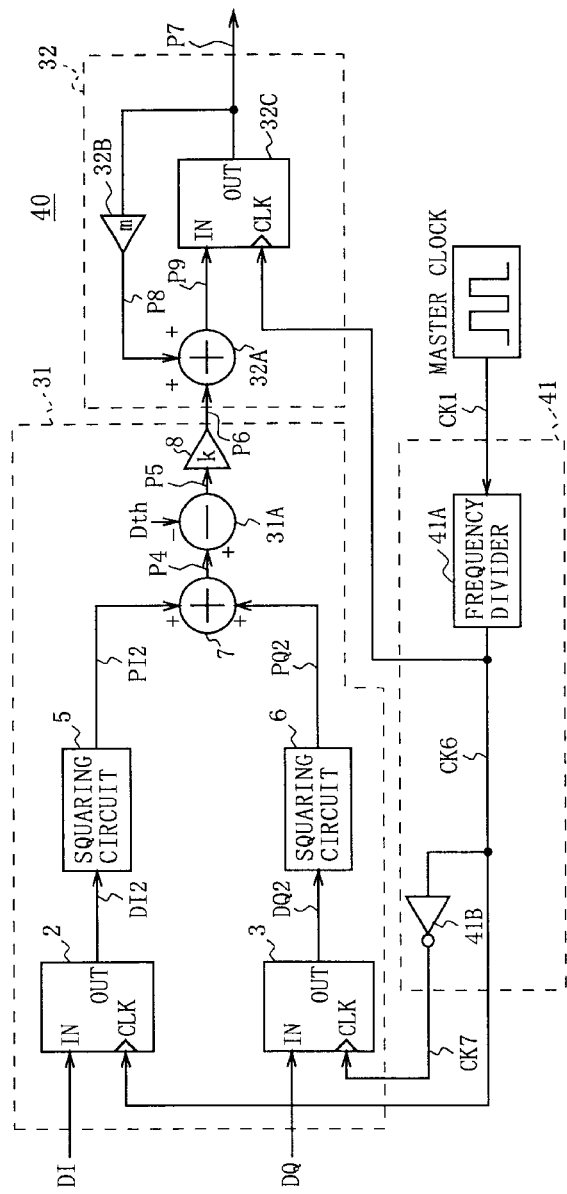
FIG. 8 is a block diagram showing a received power detection circuit according to another embodiment.

In FIG. 8 in which element and parts identical to those of FIG. 4 are marked with the same reference numerals, reference numeral 40 designates a received power detection circuit which is arranged substantially same as the received power detection circuit 16 shown in FIG. 4 except for the arrangement of the timing generator unit 41. In the timing generator unit 41 of this received power detection circuit 40, the master clock CK1 which becomes the reference operation clock of each digital circuit of the reception apparatus 10 is inputted to a frequency divider 41A. Also in this case, the master clock CK1 has a frequency four times as high as the symbol frequency of the I data DI and the Q data DQ.

In the same way as the frequency divider 30B, the frequency divider 41A generates a timing clock CK6 equaling to the symbol frequency of the I data DI and the Q data DQ by dividing the inputted master clock CK1 by four, and outputs the same to an inverter 41B serving as an inverting circuit. The inverter 41B inverts the logical level of the inputted timing clock CK6 to generate a timing clock CK7 whose phase is shifted by 180° relative to the timing clock CK6.

In this connection, the timing generator unit 41 supplies the thus generated timing clock CK6 to the latch circuit 2 of the power computation unit 31 and supplies the timing clock CK7 to the latch circuit 3 of the power computation unit 31. The latch circuit 2 latches the I data DI based on the inputted timing clock CK6, and the latch circuit 3 latches the Q data DQ based on the inputted timing clock CK7. In this case, since the timing clock CK6 and the timing clock CK7 are phase-shifted by 180° from each other, the timings at which the I data DI and the Q data DQ are latched are shifted by 180° from each other.

In this connection, the phases of the I data DI and the Q data DQ are coincident with each other. Therefore, since the phase of the timing clock CK6 agrees with the symbol edge of the I data DI, when the I data DI is latched at the timing of the symbol edge, the Q data DQ is latched near the center of the symbol. Conversely, since the phase of the timing clock CK6 agrees with near the center of the symbol, when the I data DI is latched at the timing near the center of the symbol, the Q data DQ is latched at the timing of the symbol edge.

This received power detection circuit 40 also computes the power data P6 by squaring and adding the I data DI2 and the Q data DQ2 thus latched, and finally averages the power data P6 to compute the received power value P7. Thus, when the received power P7 is computed by using the two timing clocks CK6 and CK7 whose phases are shifted by 180° and when the received power value P7 is computed by using one timing clock CK3 whose phase is shifted at every symbol like the first embodiment, the computed received power values P7 become substantially equal to each other by the above-mentioned averaging processing.

When there are two patterns in which the phase is shifted, if the phases of the two inputted data (DI and DQ) agree with each other, then same effects as those of the above first embodiment may be achieved by computing the received power value P7 by using the predetermined timing clock and the inverted timing clock. Further, as the timing generator unit 41 has only to invert the timing clock, the arrangement of the timing generator unit 41 may be simplified.

Incidentally, while the timing generator unit 41 generates the timing clock CK7 whose phase is shifted by 180° by inverting the timing clock CK6 as described above, the phase shift amount is not limited thereto, and may be about 90°, for example. The reason for this is that, when one inputted data is latched at the portion in which the voltage amplitude is small, if the other inputted data is latched at the portion in which the voltage amplitude is large, same effects may be achieved. Therefore, it is sufficient that the latch timing of at least either one inputted data or the other inputted data is shifted.

In fact, the signal power detection apparatus for detecting the synthesized power value from the first and second inputted data whose phases agree with each other should be arranged to comprise: the clock generating means for generating the first and second timing clocks with the shifted phases; the power computing means for latching the first inputted data based on the first timing clock, computing the power value of the first inputted data by squaring the voltage value of the first inputted data, latching the second inputted data based on the second timing clock, computing the power value of the second inputted data by squaring the voltage value of the second inputted data, and computing the synthesized power value by adding the computed power value of the first inputted data and the computed power value of the second inputted data; and the averaging means for averaging the thus computed synthesized power value. As a result, since the timings at which the first inputted data and the second inputted data are latched are shifted from each other, the portions in which the voltage value is small may be prevented from being latched simultaneously or the portion in which the voltage value is large may be prevented from being latched simultaneously in contrast with the prior art. Thus, the power can be accurately detected without using the high-speed timing clock which is used in the prior art. Furthermore, since the high-speed timing clock is not used, the operation speed decreases so that the power consumption may be reduced.

Moreover, the above embodiment has been described for a case where the received power detection circuit 16 which can accurately compute the received power value P7 with the low power consumption is realized by comprising: the timing generator unit 30 for generating the timing clock CK3 whose phase is sequentially shifted; the power computation unit 31 for computing the power data P6 by latching the I data DI and the Q data DQ based on the timing clock CK3; and the integrating circuit unit 32 for computing the received power value P7 by averaging the power data P6. However, this invention is not limited thereto, but may employ other circuit arrangements. In fact, if the signal power detection apparatus for detecting the power value of the inputted data comprises the clock generating means for generating the timing clock whose phase is sequentially shifted corresponding to the inputted data, the power computing means for latching the inputted data based on the timing clock and computing the power value of the inputted data by squaring the voltage value of the inputted data, and the averaging means for averaging the power value of the computed inputted data, then the timing at which the inputted data is latched is sequentially shifted. Therefore, the portion in which the voltage value of the inputted data is small may be prevented from being constantly latched and the portion in which the voltage value of the inputted data is large may be prevented from being constantly latched in contrast with the prior art, and hence the voltage values may be computed from the respective portions of the inputted data. Also, the computed power values may be averaged so that the accurate power value may be computed. Accordingly, the power can be detected accurately without using the high-speed timing clock which is used in the prior art. Further, since the high-speed timing clock is not used, the operation speed may decrease, and the power consumption may be reduced.

As described above, according to this invention, the timing clock whose phase is sequentially shifted corresponding to the inputted data is generated, the inputted data is latched based on the timing clock, the power value is computed and the power value is averaged. In consequence of this, the signal power detection apparatus can accurately detect a power without using a high-speed timing clock which is used in the prior art so that a power value can be detected at a high accuracy with a low power consumption.

Furthermore, as described above, the first and second timing clocks whose phases are shifted are generated, the first and second inputted data are latched based on the first and second timing clocks, the synthesized power value is computed by computing and averaging the respective power values and the synthesized power value is averaged. In consequence of this, the signal power detection apparatus can accurately detect a power without using a high-speed timing clock which is used in the prior art, so that a power value can be detected at a high accuracy with a low power consumption.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A signal power detection apparatus for detecting a power value of an inputted data signal, comprising:

pulse generating means for generating a timing pulse having a phase that is sequentially shifted corresponding to the inputted data signal;

power computing means for obtaining a voltage value of said inputted data signal in response to said timing pulse, and squaring the obtained voltage value to compute the power value of the inputted data signal; and averaging means for averaging said computed power value of said inputted data signal, wherein said pulse generating means includes storing means for storing a plurality of pulsed patterns differently shifted from each other in phase, wherefrom said pulsed patterns are sequentially read out in accordance with a reference clock signal, a frequency divider for frequency-dividing said reference clock signal, and a counter circuit for counting cyclically the frequency-divided clock signals outputted from said frequency divider up to the number of said pulsed patterns and producing a count number and said pulsed patterns are sequentially read out from said storing means in accordance with the count number counted by said counter circuit.

2. The signal power detection apparatus according to claim 1, wherein said power computing means comprises:

a latch circuit for obtaining the voltage value of said inputted data signal by using said timing pulse, and a squaring circuit for squaring the voltage value of said inputted data signal obtained in said latch circuit.

3. The signal power detection apparatus according to claim 1, wherein said averaging means adds the computed power value of the present input data signal which is computed in said power computing means to a computed power value prior to the computed power value of the present input data signal so as to average the computed power values of said input data signals.

4. The signal power detection apparatus according to claim 1, wherein said averaging means further comprises:

an adding circuit having two input terminals and being supplied with said computed power value in one of the input terminals from said power computing means;

a latch circuit having an input terminal connected with an output terminal of said adding circuit; and a multiplier for multiplying an output value of said latch circuit by a stated coefficient to supply a multiplied result to the other input terminal of said adding circuit.

5. A signal power detection apparatus which detects a synthesized power value of a first inputted data signal and a second inputted data signal whose phases agree with each other, comprising:

pulse generating means for generating a first timing pulse and a second timing pulse including a reference clock generator for generating a reference clock signal, a frequency divider for frequency dividing said reference clock signal, and an invertor for inverting an output signal of said frequency divider, wherein an output of said frequency divider forms said first timing pulse and output of said invertor forms said second timing pulse, so that said timing pulses are synchronized with an inputted data signal and shifted from each other in phase;

power computing means for
obtaining a voltage value of said first inputted data signal by using said first timing pulse generated in said pulse generating means,
computing a power value of said first inputted data signal by squaring said obtained voltage value of said first inputted data signal,
obtaining a voltage value of said second inputted data signal by using said second timing pulse generated in said pulse generating means,
computing a power value of said second inputted data signal by squaring said obtained voltage value of said second inputted data signal, and
computing a synthesized power value by adding said computed power values of said first and second inputted data signals; and averaging means for averaging said computed synthesized power values.

* * * * *